(12) United States Patent
Uchida et al.

(10) Patent No.: US 10,464,627 B2
(45) Date of Patent: Nov. 5, 2019

(54) STRADDLED VEHICLE

(71) Applicant: YAMAHA HATSUDOKI KABUSHIKI KAISHA, Iwata-shi, Shizuoka-ken (JP)

(72) Inventors: Tetsuya Uchida, Shizuoka (JP); Hiroki Yagi, Shizuoka (JP); Shojiro Ohama, Shizuoka (JP); Munemitsu Eguchi, Shizuoka (JP)

(73) Assignee: YAMAHA HATSUDOKI KABUSHIKI KAISHA, Iwata-Shi, Shizuoka-Ken (JP)

( * ) Notice: Subject to any disclaimer, the term of this patent is extended or adjusted under 35 U.S.C. 154(b) by 160 days.

(21) Appl. No.: 15/843,799

(22) Filed: Dec. 15, 2017

(65) Prior Publication Data
US 2018/0346052 A1 Dec. 6, 2018

(30) Foreign Application Priority Data

Jun. 2, 2017 (JP) .................................. 2017-110484

(51) Int. Cl.
| | | |
|---|---|---|
| *B62K 11/04* | (2006.01) | |
| *B62J 9/00* | (2006.01) | |
| *B62J 31/00* | (2006.01) | |
| *B62J 35/00* | (2006.01) | |
| *B62K 19/12* | (2006.01) | |
| *B62K 19/40* | (2006.01) | |

(52) U.S. Cl.
CPC ............. *B62K 11/04* (2013.01); *B62J 9/001* (2013.01); *B62J 31/00* (2013.01); *B62J 35/00* (2013.01); *B62K 19/12* (2013.01); *B62K 19/40* (2013.01)

(58) Field of Classification Search
CPC ................................ B62J 31/00; B62K 19/12
See application file for complete search history.

(56) References Cited

U.S. PATENT DOCUMENTS

| | | | | |
|---|---|---|---|---|
| 707,922 | A * | 8/1902 | Hedstrom | B62K 11/04 180/219 |
| 4,911,474 | A * | 3/1990 | Fukuda | B62J 35/00 180/219 |
| 5,031,580 | A * | 7/1991 | Takagi | F01M 1/12 123/196 R |
| 5,054,571 | A * | 10/1991 | Takasaka | B62J 31/00 138/172 |
| 6,186,550 | B1 * | 2/2001 | Horii | B62D 21/16 180/225 |

(Continued)

FOREIGN PATENT DOCUMENTS

JP         2002-364478 A    12/2002

*Primary Examiner* — Joseph M Rocca
*Assistant Examiner* — Harold Eric Pahlck, III
(74) *Attorney, Agent, or Firm* — Rabin & Berdo, P.C.

(57) ABSTRACT

A motorcycle includes a head pipe, a main frame that extends rearwardly and downwardly from the head pipe, and a V-type engine supported by the main frame. Further, the motorcycle includes a rear frame that is supported by the main frame and extends rearwardly from the main frame, a seat arranged upwardly of the rear frame and supported by the rear frame and a tank forming member attached to part of the rear frame via a gasket. The rear frame and the tank forming member are formed by casting. Part of the rear frame, the gasket and the tank forming member integrally form an oil tank. The oil tank is located at a position farther downward than the seat.

5 Claims, 12 Drawing Sheets

(56) References Cited

U.S. PATENT DOCUMENTS

| | | | | |
|---|---|---|---|---|
| 6,609,585 B2* | 8/2003 | Buell | ............... | B62J 31/00 |
| | | | | 180/227 |
| 6,994,150 B1* | 2/2006 | Kline | ............... | B62J 27/00 |
| | | | | 123/196 AB |
| 7,137,637 B2* | 11/2006 | Ackley | ............... | B62J 15/00 |
| | | | | 280/152.1 |
| 7,975,799 B2* | 7/2011 | James | ............... | B62J 31/00 |
| | | | | 180/291 |

* cited by examiner

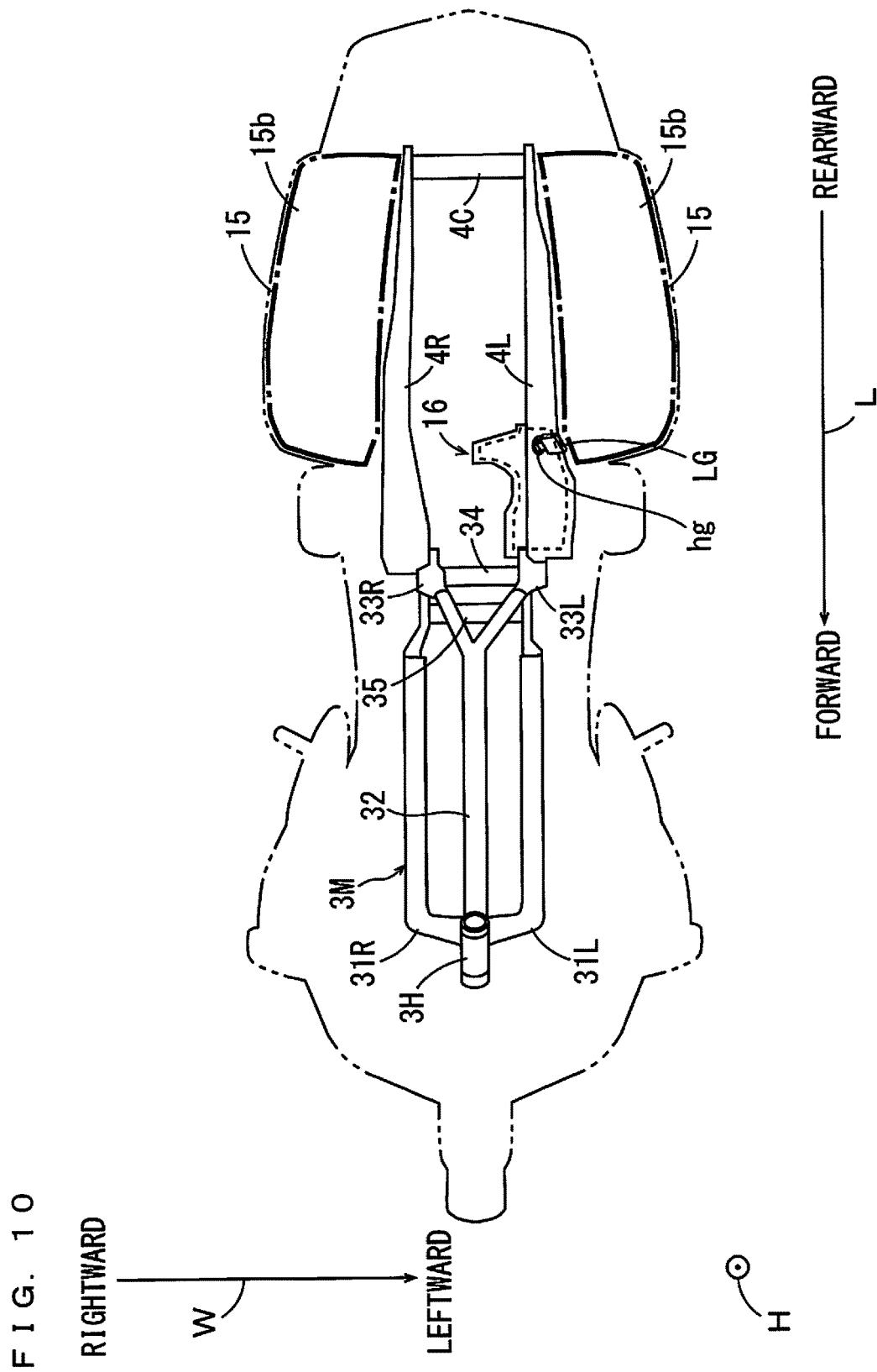

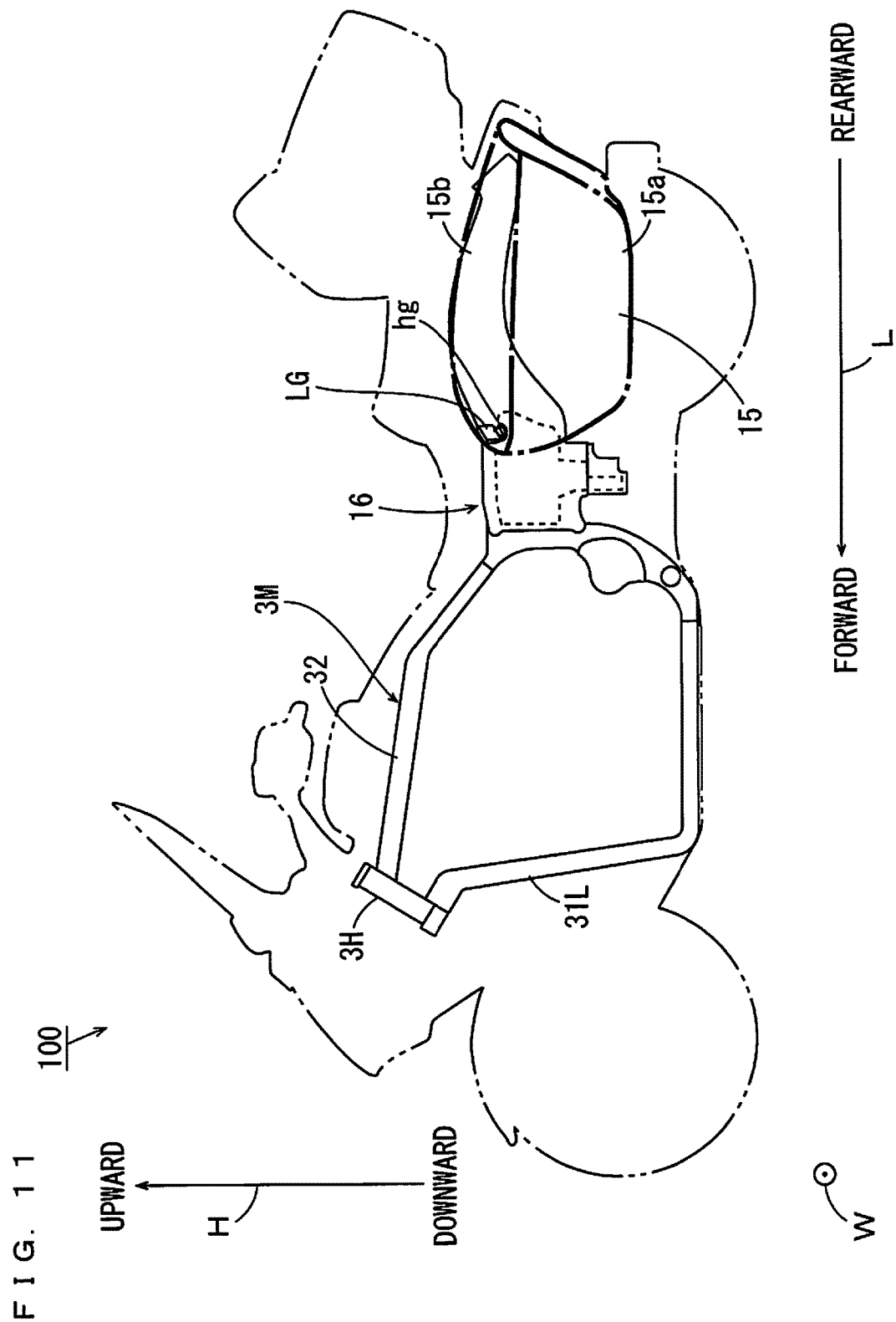

STRADDLED VEHICLE

BACKGROUND OF THE INVENTION

Field of the Invention

The present invention includes a straddled vehicle including a V-type engine.

Description of Related Art

In a motorcycle including a V-type engine, a size of an engine in a top-and-bottom direction can be reduced by use of an oil tank that is separate from the engine. In the motorcycle described in JP 2002-364478 A, an oil tank is arranged below a seat rail that supports a seat rearwardly of the V-type engine.

BRIEF SUMMARY OF THE INVENTION

In the above-mentioned motorcycle described in JP 2002-364478 A, it is necessary to sufficiently ensure capacity of the oil tank. Further, because the oil tank is provided separately from the engine, it is necessary to ensure a sufficient space in which the oil tank can be disposed while interference with another member is avoided. In the motorcycle described in JP 2002-364478 A, the oil tank is arranged between a seat rail (a main frame), which continuously extends from a tank rail, and the engine. That is, it is necessary to separate the seat rail upwardly from the engine in order for the oil tank to be disposed. However, in the vehicle including the V-type engine, the V-type engine has a forwardly inclined cylinder and a rearwardly inclined cylinder, so that a space between the tank rail and the seat rail, and the engine is unlikely to be ensured. Thus, when the seat rail is arranged at a high position in order for a space for the oil tank to be ensured, the height of a center of gravity of a rider who is seated on a seat is increased.

An object of the present invention is to provide a straddled vehicle that enables a rider to travel a long distance comfortably.

(1) A straddled vehicle according to one aspect of the present invention includes a head pipe, a main frame that extends rearwardly and downwardly from the head pipe, a V-type engine supported by the main frame, a rear frame that is formed by casting, is supported by the main frame and extends rearwardly from the main frame, a seat that is arranged upwardly of the rear frame and supported by the rear frame, and a tank forming member formed by casting and attached to part of the rear frame via a gasket, wherein the part of the rear frame, the gasket and the tank forming member integrally form an oil tank, and the oil tank is located at a position farther downward than the seat.

In the straddled vehicle, the tank forming member formed by casting is attached to the part of the rear frame formed by casting via the gasket, whereby the oil tank is formed. In this case, the tank forming member and part of the rear frame can be respectively and easily formed into complicated shapes utilizable as the oil tank. Further, because the part of the rear frame can be utilized as a space for the oil tank, the space for the oil tank can be easily ensured. Further, in this case, a space for avoiding the interference between the oil tank and another member is reduced.

Further, because the rear frame extends in the vehicle front-and-rear direction, the size of the oil tank in the front-and-rear direction is likely to increase. Thus, the sizes of the joint surfaces of the part of the rear frame and the tank forming member that form the oil tank increase. Even in such a case, sealability between the part of the rear frame and the tank forming member is ensured by the gasket. Therefore, capacity of the oil tank is easily and largely ensured while the sizes of the oil tank in the vehicle width direction and the top-and-bottom direction are inhibited from increasing.

In this manner, a space for arrangement of the oil tank below the rear frame is reduced. Thus, the height of the rear frame and the seat can be inhibited from increasing, so that a center of gravity of a rider who is seated on the seat can be lowered. As a result, the rider can travel a long distance comfortably.

(2) The rear frame may include a pair of left and right rear frame members, the pair of rear frame members may have side surfaces facing each other, and the tank forming member may be joined to the side surface of one rear frame member of the pair of rear frame members via the gasket.

In this case, because the tank forming member is arranged in a space between the pair of rear frame members, a space for arrangement of the tank forming member below the pair of rear frame members is unnecessary. Therefore, the rear frame and the seat can be lowered.

(3) The main frame may include a pair of left and right main frame members and a coupling member that couples the pair of main frame members to each other, the coupling member may extend in a vehicle width direction, and a first oil flow path that leads oil supplied from the oil tank to the engine may be formed in the coupling member.

In this case, a space for the oil pipe extending from the oil tank can be reduced.

(4) The straddled vehicle may further include a second oil flow path that leads oil from the oil tank to the first oil flow path, wherein a drain port may be provided at a position farther downward than a lower end of the oil tank and of a lowest end of the second oil flow path, and a drain bolt may be fitted into the drain port.

In this case, because the drain port is provided in the vicinity of an end of the coupling member, the oil can be easily changed.

(5) The straddled vehicle may further include a side case arranged outwardly of the rear frame in a vehicle width direction in a plan view of the vehicle, wherein the side case may include a storage having an upper opening, and a lid provided to open and close the upper opening, the oil tank may have a gauge insertion port into which an oil level gauge is inserted, and in a side view of the vehicle, the gauge insertion port may be arranged at a position farther rearward than a front end of the lid being closed and farther forward than a rear end of the lid being closed, and may be arranged at a position farther downward than an upper end of the lid being closed and farther upward than a lower end of the lid being closed.

In this case, the gauge insertion port can be kept from sight by the lid when the lid of the side case is closed, and the oil level gauge can be pulled out of or inserted into the gauge insertion port when the lid is opened.

Other features, elements, characteristics, and advantages of the present invention will become more apparent from the following description of preferred embodiments of the present invention with reference to the attached drawings.

BRIEF DESCRIPTION OF THE SEVERAL VIEWS OF THE DRAWING

FIG. 10 is a plan view showing a positional relationship between the oil tank and side cases;

FIG. 11 is a left side view showing a positional relationship between the oil tank and a left side case.

DESCRIPTION OF THE PREFERRED EMBODIMENTS

A straddled vehicle according to embodiments of the present invention will be described below with reference to drawings. In the following description, a motorcycle is described as one example of the straddle vehicle.

(1) Schematic Configuration of Motorcycle

Figure 1:
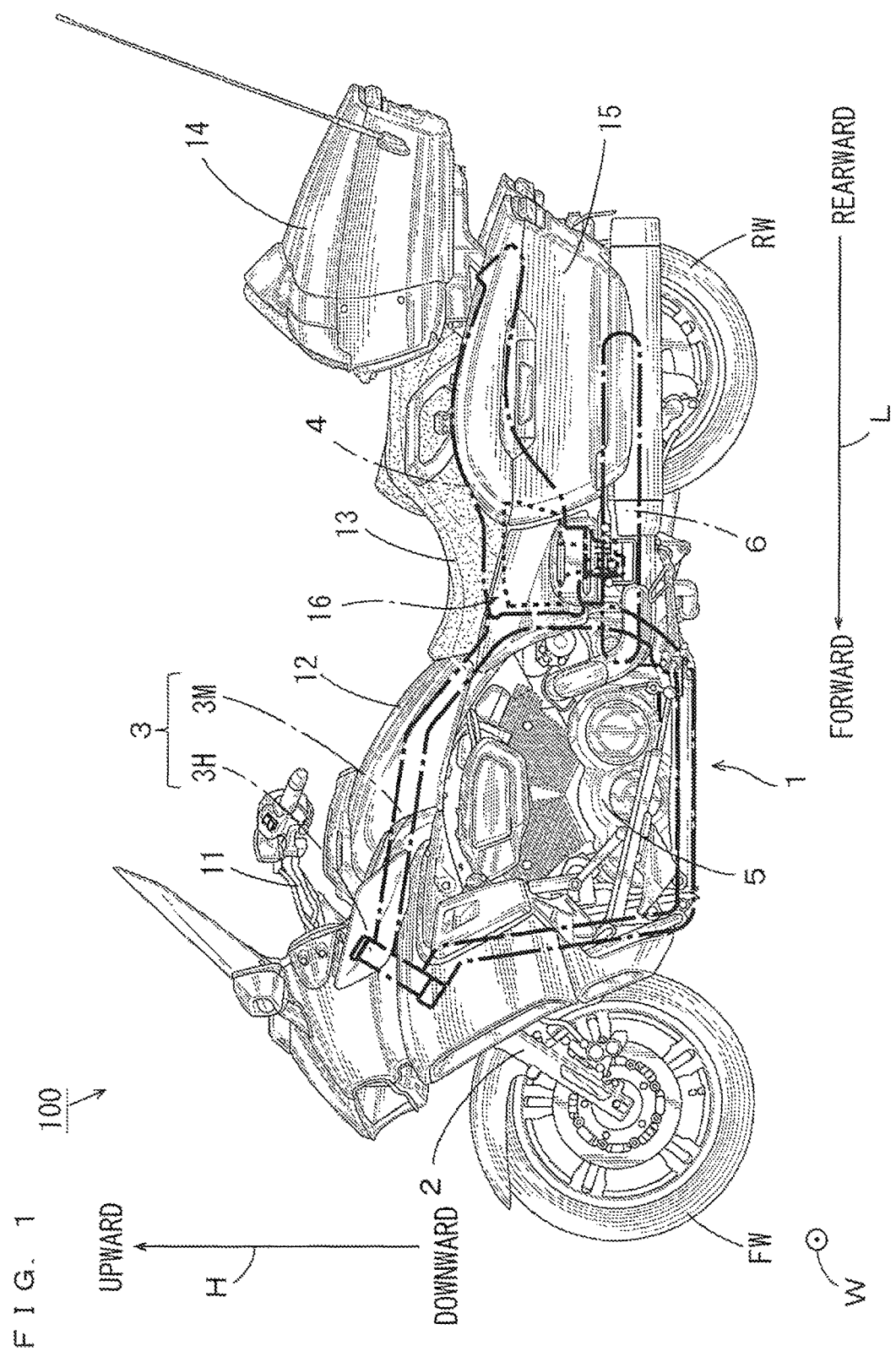
FIG. 1 is a side view of a motorcycle according to one embodiment of the present invention.
Figure 2:
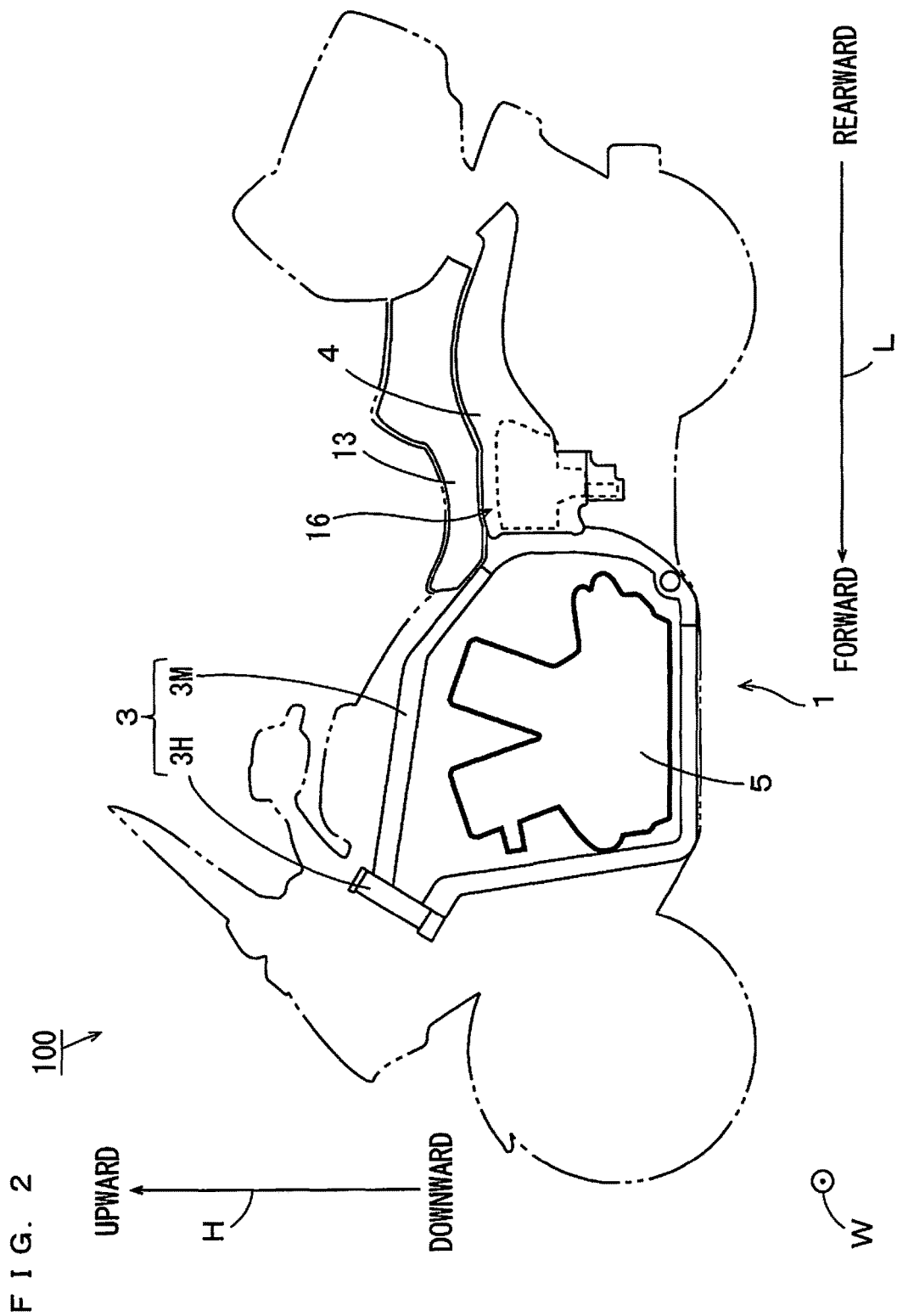
FIG. 2 is a side view mainly showing a configuration of a vehicle body of the motorcycle of FIG. 1.

FIG. 1 is a side view of the motorcycle according to one embodiment of the present invention. FIG. 2 is a side view mainly showing a configuration of a vehicle main body of the motorcycle of FIG. 1. In FIG. 1, the motorcycle 100 standing up to be perpendicular to the road surface is shown. In FIG. 1 and the subsequent diagrams, a front-and-rear direction L, a width direction W and a top-and-bottom direction H of the motorcycle 100 are indicated by arrows accordingly. In the following description, a direction in which the arrow is directed in the front-and-rear direction L is referred to as forward, and its opposite direction is referred to as rearward. Further, a direction in which the arrow is directed in the width direction W is referred to as leftward, and its opposite direction is referred to as rightward. A direction in which the arrow is directed in the top-and-bottom direction H is referred to as upward, and its opposite direction is referred to as downward.

As shown in FIG. 1, the motorcycle 100 according to the present embodiment is a so-called cruiser-type motorcycle. The vehicle main body 1 of the motorcycle 100 includes a front fork 2, a body frame 3, a rear frame 4, a V-type engine 5 and a swing arm 6. In FIG. 1, the body frame 3, the rear frame 4 and the swing arm 6 are indicated by thick one-dot and dash lines. The body frame 3 includes a head pipe 3H and a main frame 3M. The main frame 3M is formed to extend rearwardly and downwardly from the head pipe 3H.

The front fork 2 is attached to the head pipe 3H. A front wheel FW is rotatably provided at a lower end of the front fork 2. A handle 11 is provided above the head pipe 3H, and a fuel tank 12 is provided rearwardly of the handle 11. The fuel tank 12 is supported by the main frame 3M. A seat 13 is provided rearwardly of the fuel tank 12. A rear case 14 is provided rearwardly of the seat 13.

The swing arm 6 is supported by the body frame 3 together with the engine 5, and is provided to extend rearwardly below the rear frame 4 from a lower portion at a rear end of the body frame 3. A rear wheel RW is rotatably provided at a rear end of the swing arm 6. The rear wheel RW is rotated by motive power generated by the engine 5.

A pair of left and right side cases 15 is provided to partially overlap with the rear frame 4 and the swing arm 6 in a side view of the vehicle. The left and right side cases 15 is attached to the rear frame 4 to partially sandwich the rear frame 4 in the width direction W.

As shown in FIG. 2, the engine 5 is arranged in a region surrounded by the body frame 3 in the side view of the vehicle, and is supported by the body frame 3. The rear frame 4 is provided to extend rearwardly from the rear end of the body frame 3. The seat 13 is arranged above the rear frame 4 and mainly supported by the rear frame 4.

An oil tank 16 is formed of part of the rear frame 4, a side-wall piece described below as a tank forming member 16b (FIGS. 3, 4 and 6) and a gasket 16c (FIG. 4), described in further detail below. The oil tank 16 is located at a position farther downward than the seat 13.

(2) Configuration of Oil Tank 16

Figure 3:
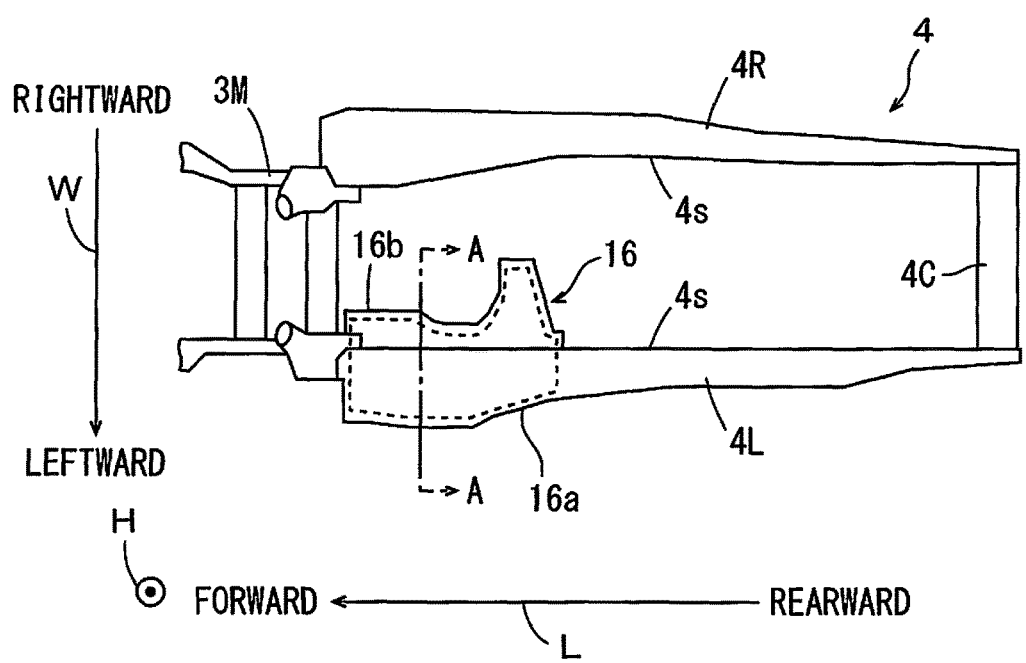
FIG. 3 is a plan view mainly showing a rear frame and an oil tank.

FIG. 3 is a plan view mainly showing the rear frame 4 and the oil tank 16. As shown in FIG. 3, the rear frame 4 is constituted by a pair of left and right rear frame members 4L, 4R and a coupling member 4C. Rear ends of the pair of rear frame members 4L, 4R are coupled by the coupling member 4C. The pair of rear frame members 4L, 4R has side surfaces 4s facing each other. Further, in one embodiment, each of the pair of rear frame members 4L, 4R is formed by casting.

Figure 4:
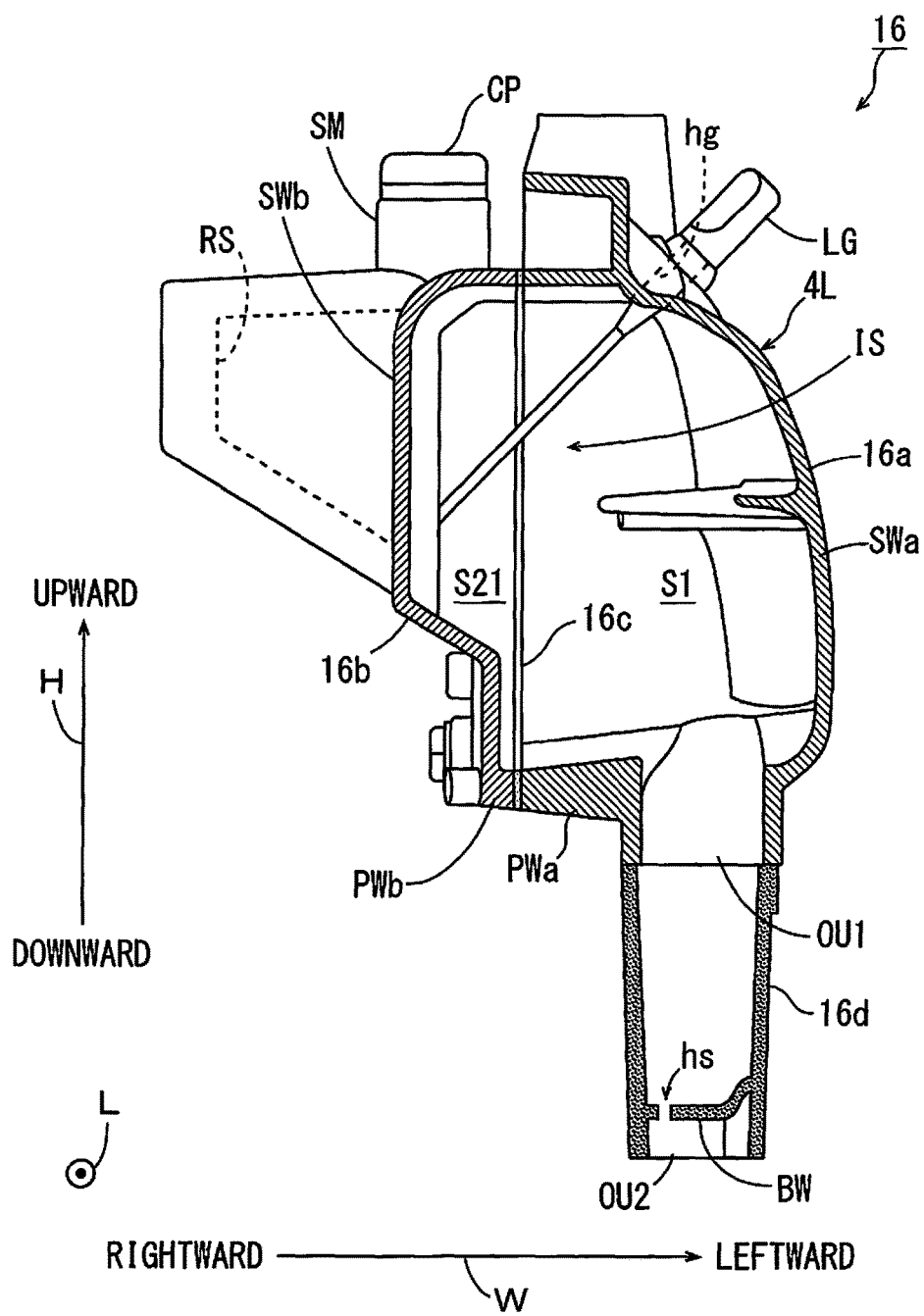
FIG. 4 is a longitudinal cross sectional view taken along the line A-A of the oil tank of FIG. 3.

The tank forming member 16b is joined to the side surface 4s of one rear frame member (the left rear frame member 4L in the present embodiment) of the pair of rear frame members 4L, 4R via the gasket 16c (FIG. 4). Thus, the oil tank 16 is formed of part (hereinafter referred to as a frame portion 16a) of the rear frame member 4L, the tank forming member 16b, and the gasket 16c (FIG. 4). In other words, the side-wall piece that makes up the tank forming member 16b has an inner surface that defines a part of a cavity, the rear frame member (4L, 4R) includes a depression that defines a part of a cavity, and the tank forming member 16b attaches to the rear frame member (4L, 4R) via the gasket 16c to thereby, together, define the fluid-tight cavity that is the oil tank 16. In this case, the tank forming member 16b is arranged in a space between the pair of rear frame members 4L, 4R. Further, in one embodiment, the tank forming member 16b is formed by casting.

Figure 5:
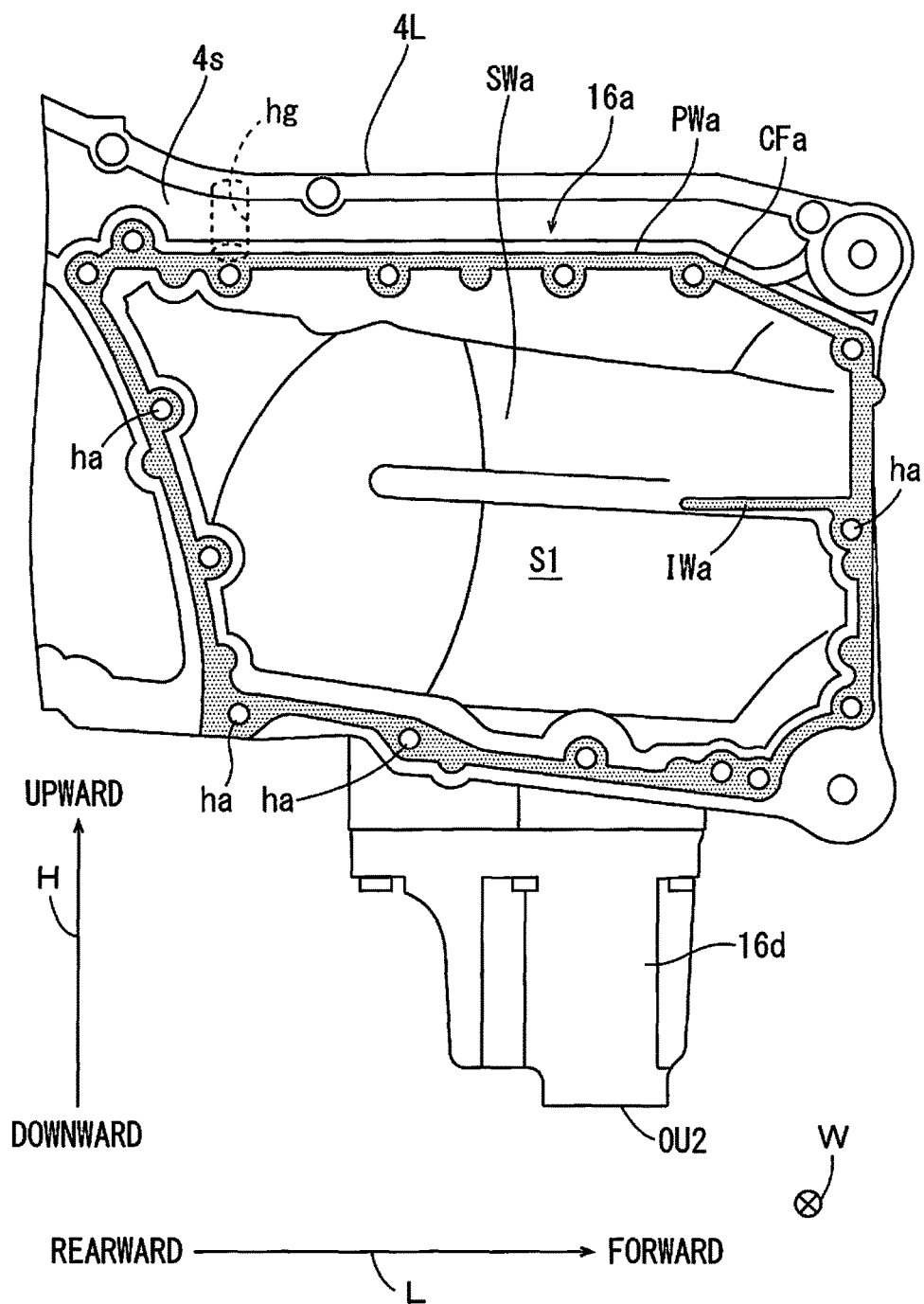
FIG. 5 is a right side view of a frame portion.
Figure 6:
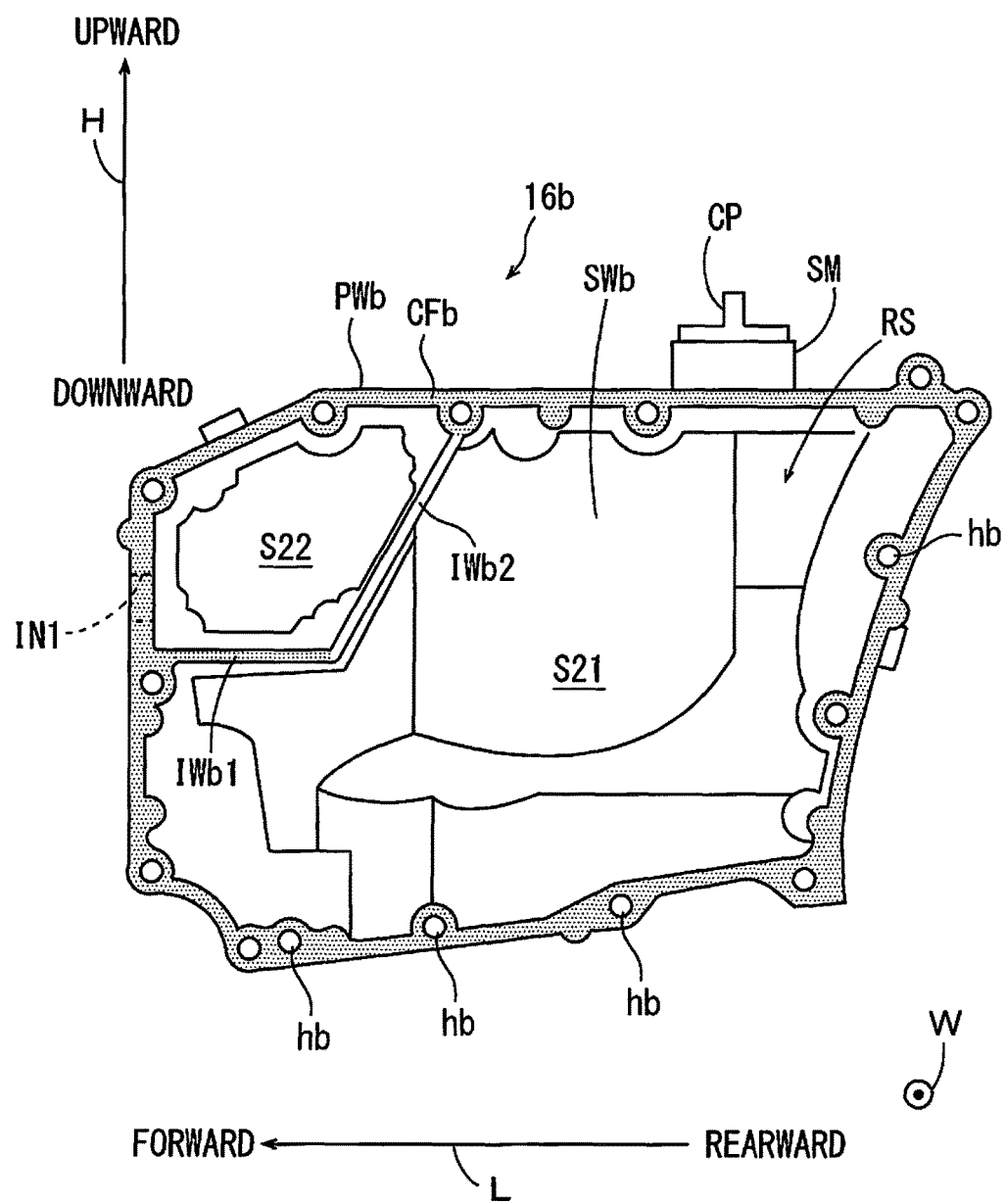
FIG. 6 is a left side view of a tank forming member.

FIG. 4 is a longitudinal cross sectional view taken along the line A-A of the oil tank 16 of FIG. 3. FIG. 5 is a right side view of the frame portion 16a. FIG. 6 is a left side view of the tank forming member 16b.

As shown in FIGS. 4 and 5, the frame portion 16a has a peripheral wall PWa and a sidewall SWa. As shown in FIG. 5, an outer edge of the sidewall SWa is substantially rectangular in the side view of the vehicle. This sidewall SWa is curved so as to bulge outward in a front view of the vehicle (see FIG. 4). The peripheral wall PWa is formed to extend along the outer edge of the sidewall SWa and is substantially rectangular in the side view of the vehicle. Thus, a space S1 surrounded by the peripheral wall PWa and the sidewall SWa is formed. An inner wall IWa is formed to substantially horizontally and rearwardly extend from a front portion of the peripheral wall PWa. The peripheral wall PWa and the inner wall IWa have a flat joint surface CFa. In FIG. 5, a dotted pattern is applied to the joint surface CFa. A plurality of bolt holes ha that are opened in the joint surface CFa are provided in the peripheral wall PWa.

As shown in FIG. 4, a gauge insertion port hg is provided in an upper portion of the frame portion 16a. The gauge insertion port hg is inclined to be directed towards the tank forming member 16b. An oil level gauge LG is inserted into the gauge insertion port hg. An oil output port OU1 is formed in a lower portion of the frame portion 16a. A cylindrical outlet port member 16d is attached to the frame portion 16a to extend downwardly from the oil output port OU1. The outlet port member 16d may be integrally formed with the frame portion 16a by casting. An oil outlet port OU2 is formed in a lower end of the outlet port member 16d. A bottom wall BW is formed in the vicinity of the lower end of the outlet port member 16d. A small hole hs is formed in the bottom wall BW.

As shown in FIGS. 4 and 6, the tank forming member 16b has a peripheral wall PWb and a sidewall SWb. As shown in FIG. 6, an outer edge of the sidewall SWb is substantially rectangular in the side view of the vehicle. The peripheral wall PWb is formed to extend along the outer edge of the sidewall SWb and is substantially rectangular in the side view of the vehicle. Thus, a space S21 surrounded by the peripheral wall PWb and the sidewall SWb is formed. An oil inlet port IN1 is formed in a front portion of the peripheral wall PWb. An inner wall IWb1 is formed to substantially horizontally and rearwardly extend from a front portion of the peripheral wall PWb, and an inner wall IWb2 rearwardly and upwardly extending from a rear end of the inner wall IWb1 to an upper portion of the peripheral wall PWb is formed. Thus, a space S22 sectioned by part of the peripheral wall PWb, the inner walls IWb1, IWb2 and the sidewall SWb is formed. The space S22 is connected to the oil inlet port IN1.

The peripheral wall PWb and the inner wall IWb1 have a flat joint surface CFb. In FIG. 6, a dotted pattern is applied to the joint surface CFb. A plurality of bolt holes hb that are opened in the joint surface CFb are provided in the peripheral wall PWb.

The peripheral wall PWb, the inner wall IWb1 and the joint surface CFb of the tank forming member 16b have shapes corresponding to the peripheral wall PWa, the inner wall IWa and the joint surface CFa of the frame portion 16a. Further, the plurality of bolt holes hb of the tank forming member 16b are formed at positions corresponding to the plurality of bolt holes ha of the frame portion 16a. A recess RS is formed in a rear portion of the sidewall SWb.

As shown in FIGS. 4 and 6, a cylindrical oil filling port forming portion SM is formed in an upper portion of the tank forming member 16b. The inside space of the oil filling port forming portion SM communicates with the space S21. A cap CP is detachably attached to an upper end opening of the oil filling port forming portion SM.

The gasket 16c of FIG. 4 is sandwiched between the joint surface CFa of the frame portion 16a of FIG. 5 and the joint surface CFb of the tank forming member 16b of FIG. 6, and bolts are inserted into the plurality of bolt holes ha, hb. The joint surface CFa of the frame portion 16a and the joint surface CFb of the tank forming member 16b are joined to each other via the gasket 16c by the plurality of bolts in this state. Thus, the oil tank 16 is formed. An inner space or cavity IS (FIG. 4) including the spaces S1, S21, S22 is formed in the oil tank 16. In this case, a clearance is formed between the inner wall IWb2 of the tank forming member 16b of FIG. 6 and the sidewall SWa of the frame portion 16a of FIG. 5.

Oil flows into the space S22 through the oil inlet port IN1 of FIG. 6, and further flows into the spaces S1 and S21 through the clearance between the inner wall IWb2 of the tank forming member 16b and the sidewall SWa of the frame portion 16a. The oil in the spaces S1 and S21 flows out from the oil outlet port OU2 through the oil outlet port OU1 and the small hole hs.

(3) Oil Flow Path Between Engine 5 and Oil Tank 16

Figure 7:
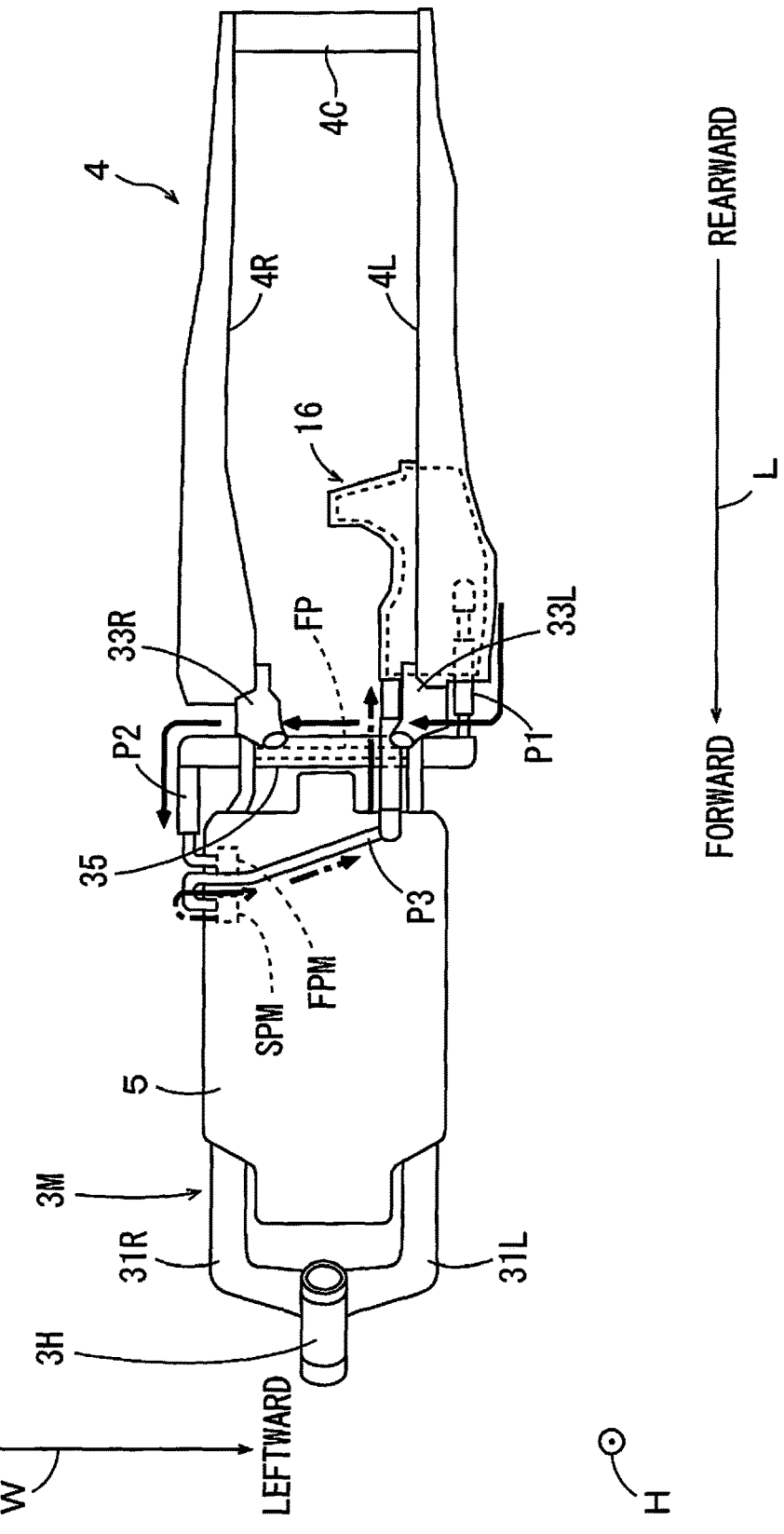
FIG. 7 is a plan view for explaining an oil flow path.
Figure 8:
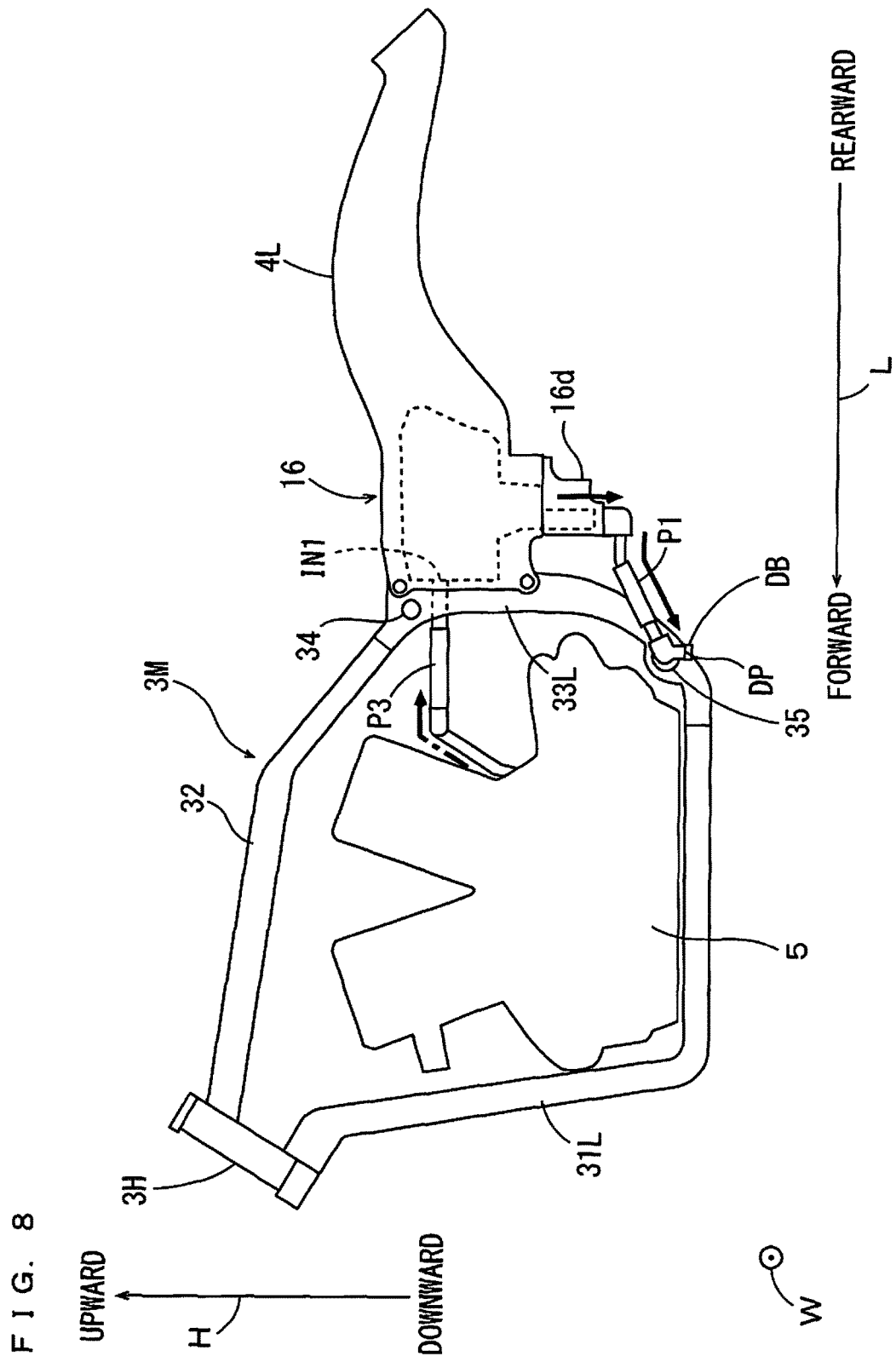
FIG. 8 is a left side view for explaining the oil flow path.
Figure 9:
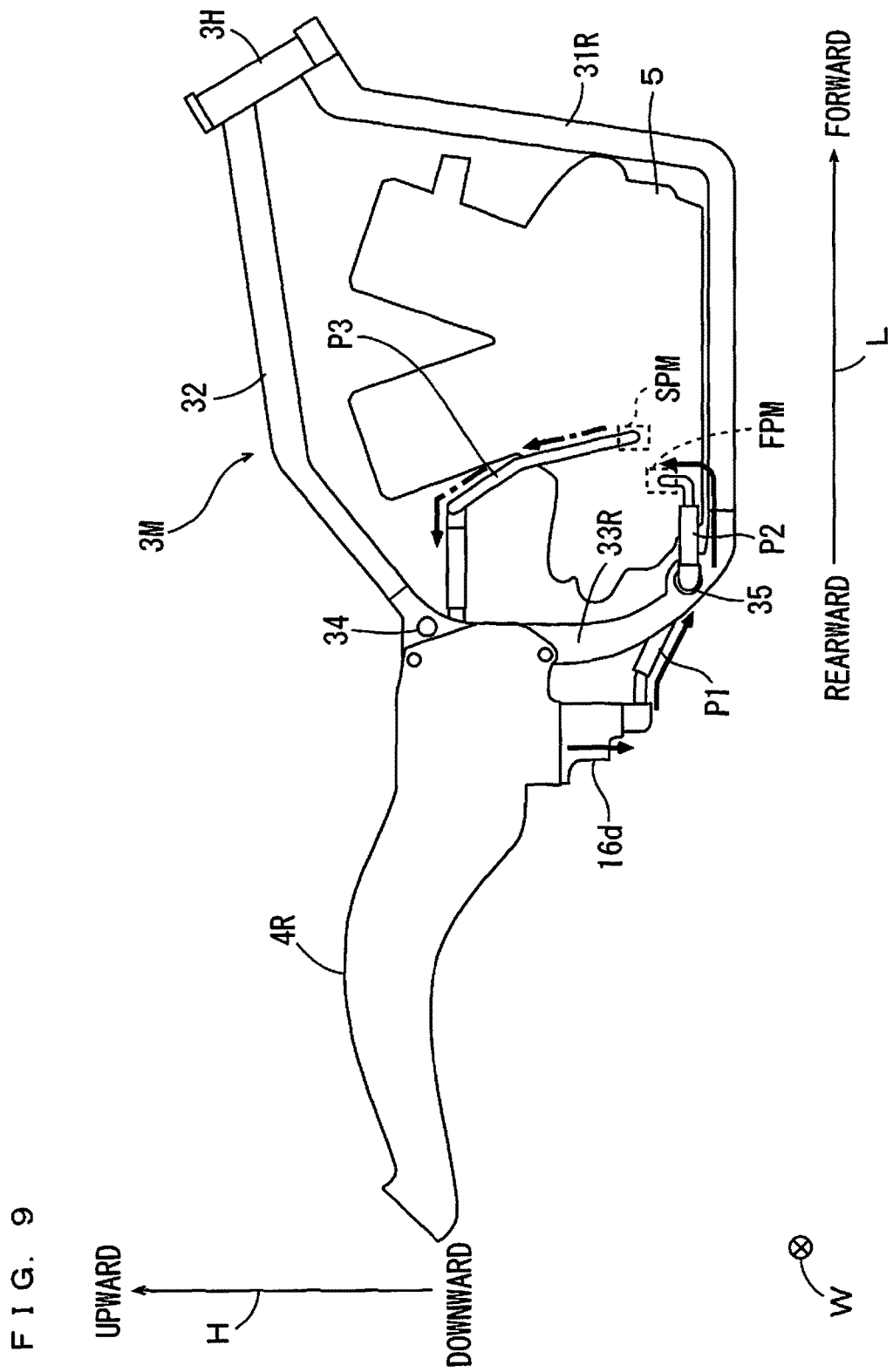
FIG. 9 is a right side view for explaining the oil flow path.

FIG. 7 is a plan view for explaining the oil flow path. FIG. 8 is a left side view for explaining the oil path. FIG. 9 is a right side view for explaining the oil flow path.

As shown in FIGS. 7 to 9, the main frame 3M includes a pair of left and right down tubes 31L, 31R, a top tube 32, a pair of left and right upper-lower members 33L, 33R, an upper cross pipe 34 and a lower cross pipe 35. The pair of upper-lower members 33L, 33R is an example of a pair of main frame members, and the lower cross pipe 35 is an example of a coupling member.

The left down tube 31L extends from a rear portion at a lower end of the head pipe 3H to a leftward rearward and downward position, is curved and then extends rearwardly. The right down tube 31R extends from a rear portion at a lower end of the head pipe 3H to a rightward rearward and downward position, is curved and then extends rearwardly. The top tube 32 extends rearwardly and downwardly from a rear portion at an upper end of the head pipe 3H. A rear portion of the top tube 32 branches to the left and right. The left upper-lower member 33L extends in the top-and-bottom direction H, and couples a rear end of the left down tube 31L to a left rear end of the top tube 32. The right upper-lower member 33R extends in the top-and-bottom direction H, and couples a rear end of the right down tube 31R to a right rear end of the top tube 32. The upper cross pipe 34 extends in the width direction W, and couples upper ends of the left and right upper-lower members 33L, 33R to each other. The lower cross pipe 35 extends in the width direction W, and couples lower ends of the left and right upper-lower members 33L, 33R to each other. The top tube 32 and the upper cross pipe 34 are not shown in FIG. 7.

As shown in FIG. 7, an oil flow path FP is formed in the lower cross pipe 35. As shown in FIG. 8, the oil outlet port (the oil outlet port OU2 of FIG. 4) of the outlet port member 16d of the oil tank 16 is connected to a left end of the lower cross pipe 35 by an oil pipe P1. A drain port DP is provided at a position lower than the oil tank 16 and of the lowest end of the oil pipe P1. A drain bolt DB is fitted into the drain port DP.

As shown in FIG. 9, a right portion of the engine 5 has a feed pump FPM and a scavenge pump SPM. A right end of the lower cross pipe 35 is connected to the feed pump FPM by an oil pipe P2. The scavenge pump SPM of FIG. 9 is connected to the oil inlet port IN1 of the oil tank 16 of FIG. 8 by an oil pipe P3.

As indicated by thick solid arrows, the oil that flows out from the outlet port member 16d of the oil tank 16 flows through the oil flow path in the oil pipe P1 of FIG. 8, the oil flow path FP in the lower cross pipe 35 of FIG. 7 and the oil flow path in the oil pipe P2 of FIG. 9, and then flows into the feed pump FPM of FIG. 9. As indicated by thick one-dot and dash arrows, the oil that has flowed out from the scavenge pump SPM of FIG. 9 flows into the oil tank 16 through the oil flow path in the oil pipe P3 of each of FIGS. 8 and 9 and the oil inlet port IN1 of FIG. 8.

According to the above-mentioned configuration, the oil flow path FP is formed in the lower cross pipe 35, so that a space for the oil pipe that is to extend from the oil tank 16 can be reduced. Further, the drain port DP is located in the vicinity of the left end of the lower cross pipe 35. Thus, the oil can be easily discharged from the oil tank 16 and can be easily changed.

(4) Positional Relationship Between Oil Tank 16 and Side Cases 15

FIG. 10 is a plan view showing the positional relationship between the oil tank 16 and the side cases 15. FIG. 11 is a left side view showing the positional relationship between the oil tank 16 and a left side case 15. FIG. 12 is a perspective view showing the oil tank 16 and the left side case 15. In each of FIGS. 10 and 11, the side cases 15 are indicated by thick one-dot and dash lines.

As shown in FIG. 10, the pair of side cases 15 is respectively arranged outside of the pair of rear frame members 4L, 4R in the width direction W in the plan view of the vehicle. As shown in FIG. 11, each side case 15 includes a storage 15a and a lid 15b. The storage 15a has an upper opening. The lid 15b is attached to an upper portion of the storage 15a to open and close the upper opening.

When the lid 15b of the left side case 15 is closed, the gauge insertion port hg of the oil tank 16 is located at a position farther rearward than a front end of the lid 15b and farther forward than a rear end of the lid 15b in the side view of the vehicle. Further, when the lid 15b of the left side case 15 is closed, the gauge insertion port hg of the oil tank 16 is located at a position farther downward than an upper end of the lid 15b and farther upward than a lower end of the lid 15b in the plan view of the vehicle.

Figure 12A:
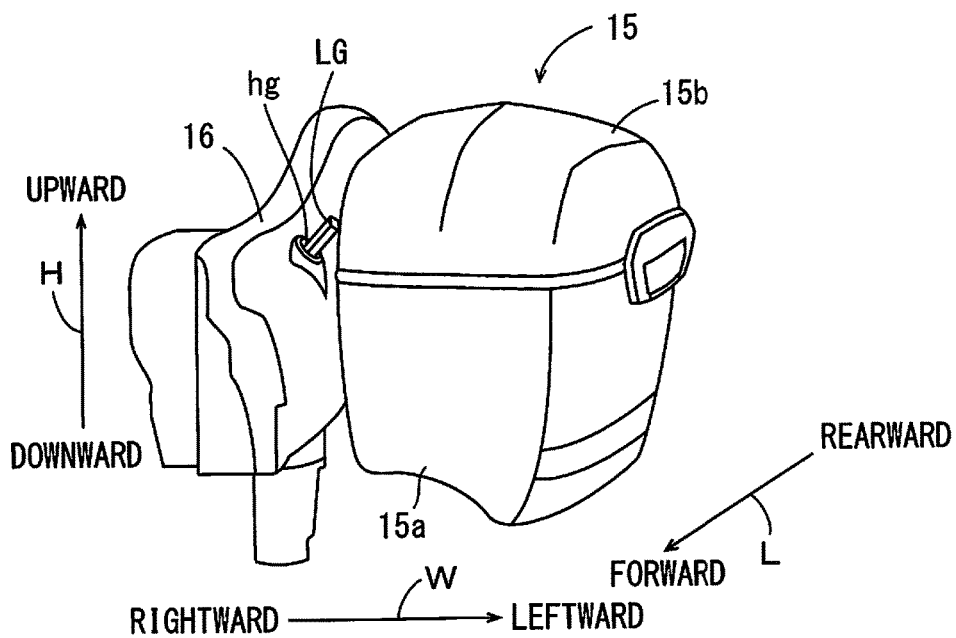
FIGS. 12A and 12B are perspective views showing the oil tank and the left side case.
Figure 12B:
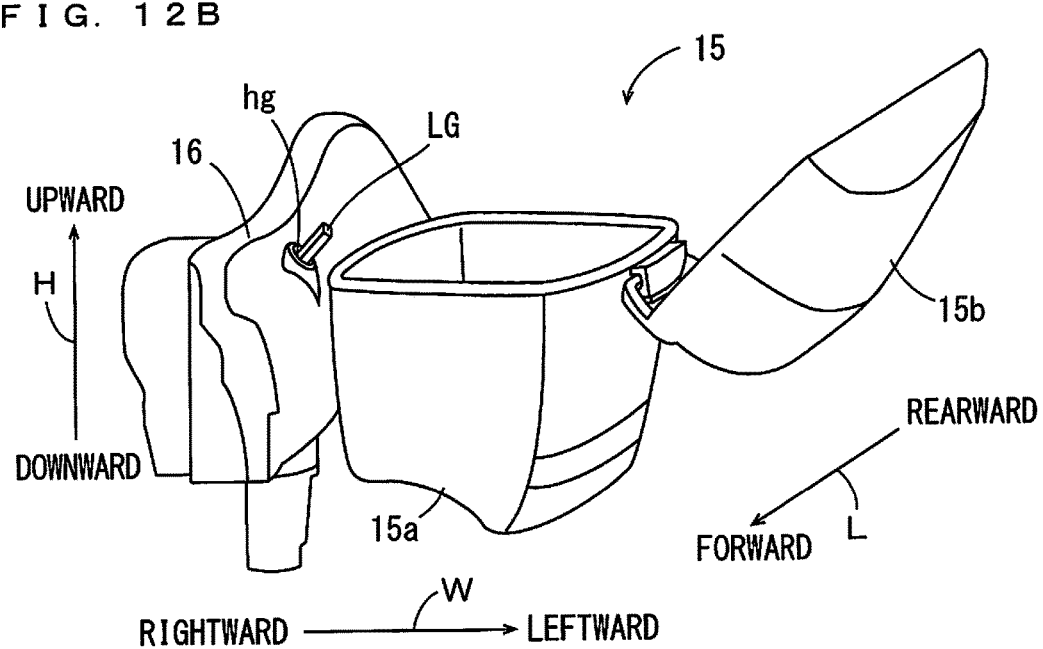

FIG. 12A shows the lid 15b of the left side case 15 being closed, and FIG. 12B shows the lid 15b of the left side case 15 being opened. As shown in FIG. 12A, when the lid 15b is closed, the gauge insertion port hg of the oil tank 16 and the oil level gauge LG are kept from sight by the lid 15b. Further, as shown in FIG. 12B, when the lid 15b is opened, the oil level gauge LG can be pulled out of and inserted into the gauge insertion port hg of the oil tank 16.

(5) Effects of Embodiments

In the motorcycle 100 according to the present embodiment, the tank forming member 16b, which may be formed by casting, is attached to the frame portion 16a of the rear frame member 4L, which may also be formed by casting, via the gasket 16c, whereby the oil tank 16 is formed. In this case, the tank forming member 16b and the frame portion 16a of the rear frame member 4L can be respectively and easily formed into complicated shapes utilizable as the oil tank 16. Further, because part of the rear frame member 4L can be utilized as a space for the oil tank 16, the space for the oil tank 16 can be easily ensured. Further, in this case, a space for avoiding interference between the oil tank 16 and another member is reduced.

Further, the rear frame member 4L extends in the front-and-rear direction L, the size of the oil tank 16 in the front-and-rear direction L is likely to increase. Thus, the sizes of the joint surfaces CFa, CFb of the rear frame member 4L and the tank forming member 16b that form the oil tank 16 increase. Even in such a case, sealability between the frame portion 16a of the rear frame member 4L and the tank forming member 16b is ensured by the gasket 16c. Therefore, capacity of the oil tank 16 is easily and largely ensured while the sizes of the oil tank 16 in the width direction W and the top-and-bottom direction H are inhibited from increasing.

In this manner, a space for arrangement of the oil tank 16 below the rear frame 4 is reduced. This enables the height of the rear frame 4 and the seat 13 to be inhibited from increasing, so that a center of gravity of a rider who is seated on the seat 13 can be lowered. As a result, the rider can travel a long distance comfortably.

Further, in the present embodiment, the tank forming member 16b is arranged in the space between the pair of rear frame members 4L, 4R, so that a space for arrangement of the tank forming member 16b below the pair of rear frame members 4L, 4R is unnecessary. Therefore, the rear frame 4 and the seat 13 can be lower according to embodiment of the invention than when an oil tank is located below the rear frame of a motorcycle.

(6) Other Embodiments (a) While the oil tank 16 is formed of the left rear frame member 4L, the tank forming member 16b and the gasket 16c in the above-mentioned embodiment, the oil tank 16 may be formed of the right rear frame member 4R, a tank forming member and a gasket.

(b) While the oil flow path OP is formed in the lower cross pipe 35 in the above-mentioned embodiment, the oil flow path OP may be formed in the upper cross pipe 34.

(c) While the above-mentioned embodiment is an example in which the present invention is applied to a cruiser-type motorcycle, the present invention is not limited to this. The present invention may be applied to another vehicle such as a scooter-type motorcycle, a racing-type motorcycle, a four-wheeled automobile, a motor tricycle or an ATV (All Terrain Vehicle).

(7) Correspondences Between Constituent Elements in Claims and Parts in Preferred Embodiments In the following paragraphs, non-limiting examples of correspondences between various elements recited in the claims below and those described above with respect to various preferred embodiments of the present invention are explained.

In the above-mentioned embodiment, the motorcycle 100 is an example of a straddled vehicle, the frame portion 16a is an example of part of a rear frame, the side surfaces 4s of the pair of rear frame members 4L, 4R are examples of a side surface, the oil flow path FP in the lower cross pipe 35 is an example of a first oil flow path, and the oil flow path in the oil pipe P1 is an example of a second oil flow path.

As each of constituent elements recited in the claims, various other elements having configurations or functions described in the claims can be also used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

We claim:
1. A straddled vehicle comprising:
a head pipe;
a main frame that extends rearwardly and downwardly from the head pipe;
a V-type engine supported by the main frame;
a rear frame that is formed by casting, is supported by the main frame and extends rearwardly from the main frame;

a seat that is arranged upwardly of the rear frame and supported by the rear frame; and a tank forming member formed by casting and attached to part of the rear frame via a gasket, wherein the part of the rear frame, the gasket and the tank forming member integrally form an oil tank, and the oil tank is located at a position farther downward than the seat.

2. The straddled vehicle according to claim 1, wherein the rear frame includes a pair of left and right rear frame members, the pair of rear frame members has side surfaces facing each other, and the tank forming member is joined to the side surface of one rear frame member of the pair of rear frame members via the gasket.

3. The straddled vehicle according to claim 2, wherein the main frame includes a pair of left and right main frame members and a coupling member that couples the pair of main frame members to each other, the coupling member extends in a vehicle width direction, and a first oil flow path that leads oil supplied from the oil tank to the engine is formed in the coupling member.

4. The straddled vehicle according to claim 3, further comprising a second oil flow path that leads oil from the oil tank to the first oil flow path, wherein a drain port is provided at a position farther downward than a lower end of the oil tank and of a lowest end of the second oil flow path, and a drain bolt is fitted into the drain port.

5. The straddled vehicle according to claim 1, further comprising a side case arranged outwardly of the rear frame in a vehicle width direction in a plan view of the vehicle, wherein the side case includes a storage having an upper opening, and a lid provided to open and close the upper opening, the oil tank has a gauge insertion port into which an oil level gauge is inserted, and in a side view of the vehicle, the gauge insertion port is arranged at a position farther rearward than a front end of the lid being closed and farther forward than a rear end of the lid being closed, and is arranged at a position farther downward than an upper end of the lid being closed and farther upward than a lower end of the lid being closed.

* * * * *